(12) United States Patent
Biggel

(10) Patent No.: US 9,248,972 B2
(45) Date of Patent: Feb. 2, 2016

(54) BELT RUN CONTROL DEVICE, IN PARTICULAR OF A FORMING AND COOLING DEVICE

(76) Inventor: Andreas Biggel, Hergatz (DE)

( * ) Notice: Subject to any disclaimer, the term of this patent is extended or adjusted under 35 U.S.C. 154(b) by 481 days.

(21) Appl. No.: 13/574,500

(22) PCT Filed: Jan. 17, 2011

(86) PCT No.: PCT/EP2011/000166
§ 371 (c)(1),
(2), (4) Date: Jul. 20, 2012

(87) PCT Pub. No.: WO2011/088978
PCT Pub. Date: Jul. 28, 2011

(65) Prior Publication Data
US 2012/0288581 A1 Nov. 15, 2012

(30) Foreign Application Priority Data
Jan. 21, 2010 (DE) .................. 10 2010 005 301

(51) Int. Cl.
*B65G 39/16* (2006.01)
*A01J 27/04* (2006.01)
*A01J 25/12* (2006.01)

(52) U.S. Cl.
CPC .............. *B65G 39/16* (2013.01); *A01J 25/12* (2013.01); *A01J 27/04* (2013.01)

(58) Field of Classification Search
CPC .......... A01J 25/12; A01J 27/04; B65G 39/16
USPC .......... 425/371, 223, 224, 446, 471
See application file for complete search history.

(56) References Cited

U.S. PATENT DOCUMENTS

| 2,530,122 | A | * | 11/1950 | Hornbostel | 474/104 |
| 2,635,475 | A | * | 4/1953 | Hornbostel | 474/104 |
| 5,091,752 | A | * | 2/1992 | Okada | 399/329 |
| 5,343,279 | A | * | 8/1994 | Nagata et al. | 399/329 |
| 5,471,289 | A | * | 11/1995 | Satoh et al. | 399/328 |
| 5,979,641 | A | * | 11/1999 | Graf | 198/807 |
| 6,181,900 | B1 | * | 1/2001 | Lee et al. | 399/165 |
| 7,623,816 | B2 | * | 11/2009 | Maki et al. | 399/312 |

FOREIGN PATENT DOCUMENTS

| DE | 1169275 | * | 11/1964 |
| DE | 203507 | A1 | 10/1983 |
| De | 196 47 763 | * | 10/2000 |
| GB | 1117531 | A | 6/1968 |
| JP | 59-172313 | * | 9/1984 |
| JP | S6112552 | A | 1/1986 |
| JP | S642070 | A | 1/1989 |
| JP | 6-271041 | * | 9/1994 |

* cited by examiner

*Primary Examiner* — James Mackey
(74) *Attorney, Agent, or Firm* — Stolmar & Partner; Robert Lelkes

(57) ABSTRACT

The invention relates to a belt run control device of an endless belt (2) revolving over at least one cylindrical roller (1), wherein the rollers (1) are each designed as deflection rollers around which the belt (2) is wrapped, and wherein for the purpose of tensioning the belt (2) at least one cylindrical roller (1) is preloaded on both sides by way of elastic elements (3) designed to be equally acting in order to center the belt (2) relative to the roller (1), and wherein a position measuring device is provided in the region of the belt (2), wherein an adjusting element (5) that can be actuated using a pneumatic piston-cylinder unit (4) is disposed on at least one side of the roller (1), characterized in that the adjusting element (5) is designed to apply a force that acts additively or subtractively with respect to the preloading force of at least one of the elastic elements (3).

18 Claims, 5 Drawing Sheets

BELT RUN CONTROL DEVICE, IN PARTICULAR OF A FORMING AND COOLING DEVICE

The invention relates to a belt run control device according to the preamble of claim 1 and especially to a belt run control device of an endless belt that is guided over at least one cylindrical roller and is tensioned by way thereof.

The invention furthermore relates to a forming and cooling device of the type described in DE 103 28 905 A1, for example, which is equipped with a belt run control device according to the invention.

Figure 6:
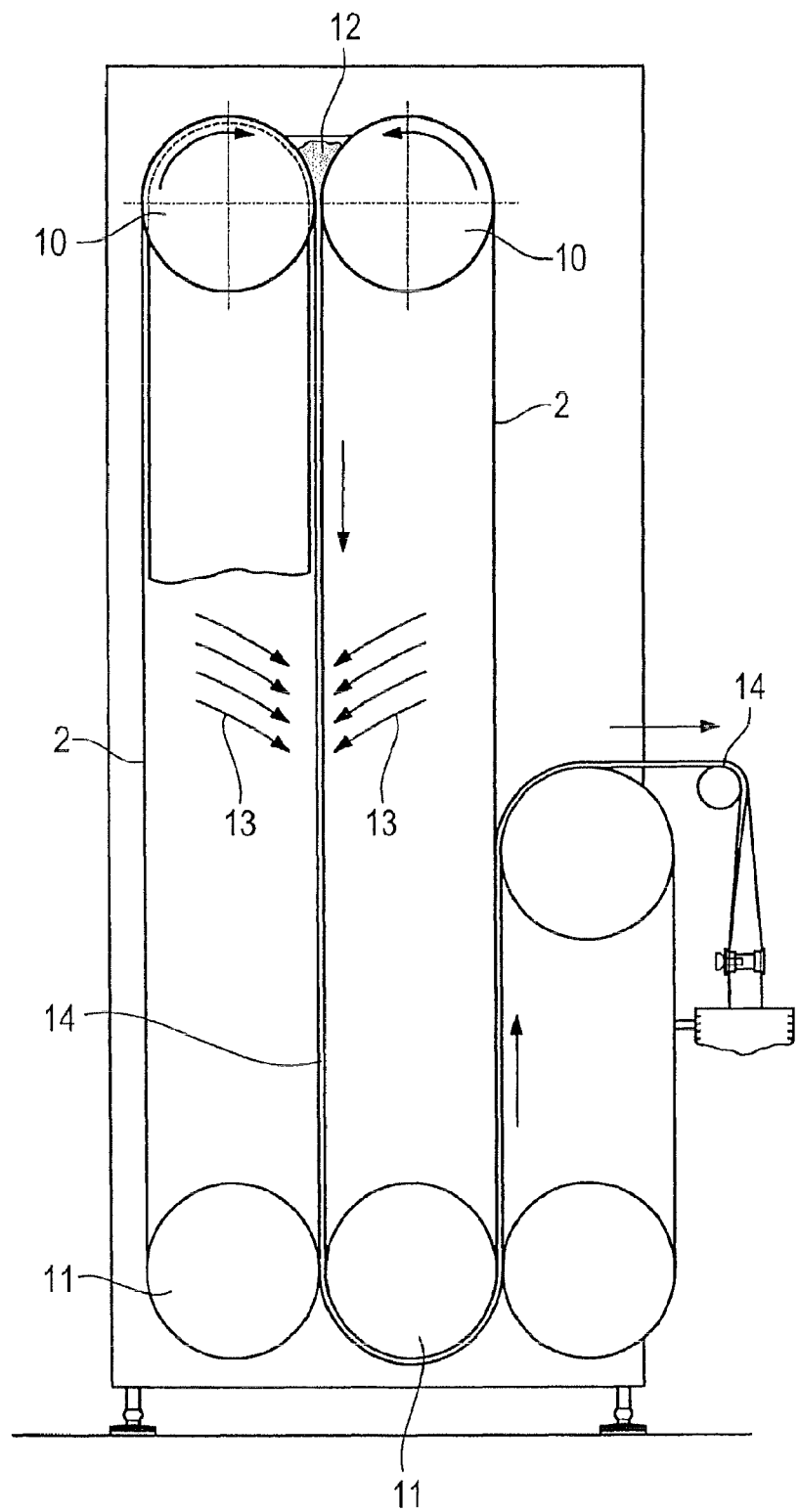

FIG. 6 shows a depiction of a forming and cooling device known from the prior art, which is described in DE 103 28 905 A1, for example. The device comprises two endless belts 2 that are spaced apart from one another and revolve over an upper roller 10 and a lower roller 11. A flowable, melted food mass 12 (processed cheese) is poured between the belts and cooled to form a strip 14. Cooling is carried out by applying a cooling fluid (13) onto the side of the belts 2 facing away from the strip 14 of the food mass.

Endless, revolving belts of that type are tensioned in different manners, wherein a slightly different preload on both sides of the belts and a resulting tilted position of a roller can cause the belt to run laterally of the roller, become damaged as a result and damage other components. It is therefore necessary to adjust the belt run.

The prior art shows, by way of DE 196 47 763 C2, a device for controlling the straight running of an endless belt. A roller is preloaded on both sides by way of elastic elements. A piston-cylinder unit is provided at one bearing end of the roller, which can apply an additional force acting in the direction of the spring preload in order to center the belt on the roller and control the belt run. The actuation of the piston-cylinder unit acting on one side additively or subtractively with respect to the spring force is carried out using two lateral sensing fingers, which sense the belt position (currently, contactless initiators are used).

DD 203 507 C2 shows a similar device for stabilizing an endless steel belt, in which the belt is unevenly pretensioned using spring preload devices acting laterally at the bearings of the roller and therefore attempts to run off in one direction. Such a belt motion is detected using a sensor. By way of an actuator, a force is applied additively with respect to the spring preload.

Furthermore, the prior art shows piston-cylinder units acting on the bearings of the roller on both sides (DE 202 10 624 U1). A similar device is already known from DE 101 06 206 A1. DE-PS 1 250 228 and BE 536 431 also show designs of that type.

The known devices are complex with respect to the feedback controls thereof and are precise only under certain conditions. With respect to the piston-cylinder units, a differentiated force application is not possible or is possible only in a technically complex way, the additive force applications with respect to the preload springs are also technically complex and are not permissible under all operating conditions.

The problem addressed by the invention is that of creating a belt run control device and a forming and cooling device of the initially-mentioned type that make reliable belt run control possible while having a simple design and usability that is simple and operationally reliable.

The problem is solved according to the invention by the combination of features of the independent claims; the related dependent claims show further advantageous embodiments of the invention.

According to the invention, it is therefore provided with respect to the belt run control device that at least one of the elastic elements is designed as the adjusting element for applying a force acting additively or subtractively with respect to the preloading force. According to the invention it is therefore possible to change the preload of the endless belt on one side in a highly targeted manner, in order to control the belt and center the belt relative to the roller. The actual load on the belt is applied by the elastic elements, which are preferably designed as disk spring assemblies. A design of that type can be manufactured simply and at low cost and can be easily adapted to various operating conditions. More particularly, the preload device can be installed and adjusted quickly and easily when the endless belt is replaced.

According to the invention, an additive or subtractive preloading force that acts in a supporting or counteracting manner with respect to the force of the elastic elements is therefore applied by the adjusting element. Since a belt of that type usually revolves slowly (at 1 to 12 m/min, for example), a slow drift results if there is non-uniform belt tension. The belt thus has relatively great hysteresis with respect to the drift motion. As a result, it is particularly favorable for belt run control, according to the invention, that an additional force can be applied additively or subtractively with respect to the preloading force. It can be, for example, a greater force for a shorter time period of 10 min to 15 min, for example, in order to initiate movement of the belt. The longer-lasting correction of the preloading force can then take place via a lesser force application. It is therefore possible, according to the invention, to induce a force for a shorter time period of 10 min to 15 min, for example, by applying hydraulic pressure or pneumatics of 1.5 bar using the piston-cylinder unit, while the long-term correction of the preloading force only requires a pressure of 0.1 bar, for example.

By way of the possibility, which is provided according to the invention, to apply an additional force additively or subtractively with respect to the preloading force and maintain it for a longer time period independently of travel, it is possible to easily compensate and correct temperature differences of the endless, revolving belt, for example, and the belt run differences resulting from different linear expansions. The lower roller, the position of which can change due to the thermal expansion of the belt, for example, is therefore acted upon by the additional force, and so a drift of the belt caused by temperature changes is corrected. The additional force, which is applied by the piston-cylinder unit, remains the same regardless of the position of the roller axis in any other respect, which can change due to the aforementioned thermal expansion or different installation settings, for example. The additional force applied by the piston-cylinder unit is therefore independent of the pretension travel of the belt.

In an advantageous embodiment of the invention, the adjusting element is in the form of a second-order lever, one end region of which is pivotably supported and at the other end region of which and at the central region the piston-cylinder unit and the elastic preload element, respectively, are coupled.

In order to provide a simple position measuring device for the endless belt according to the invention, it is favorable when the position measuring device is disposed on only one side of the belt. It comprises at least one inductively acting sensor. It is particularly favorable when the roller has a smaller width than the belt. A laterally overhanging region of the belt therefore results, which, according to the invention, is detectable by the position measuring device. If two inductive sensors, for example, are used according to the invention, they can therefore be disposed in a laterally offset manner.

One of the sensors therefore detects the regular lateral overhang of the belt, while the other sensor detects an unwanted lateral drift of the belt. If the belt should run in the other direction, both sensors would output changed output values. In this manner it is very easily possible, according to the invention, to implement belt run control in a structurally simple way.

In the practical implementation of the invention, it is therefore provided in a particularly favorable embodiment that each of the sensors is disposed with 15 mm clearance from the on-center position of the belt edge. A first sensor is therefore disposed 15 mm outside of the belt, for example, and a second sensor is disposed 15 mm within the belt. Provided the belt edge is located within these two sensors, no control intervention takes place. If the first sensor becomes covered by the belt edge or if the second sensor is no longer covered by the belt edge, control intervention takes place in one direction or the other. If the first one responds to a displacement of the belt, for example, a compression force, that is, an additional preload, is applied using the piston-cylinder unit. If the second, inner sensor responds, a tension force is applied, by way of which the preload, using a disk spring assembly, for example, of the belt is reduced. According to the invention, a distinct additional force is applied abruptly by way of the piston-cylinder unit using a pressure of 0.5 to 2 bar, for example. This burst is advantageous and required in order to overcome the existing hysteresis in the belt run. Next, the additional force is increased further in a linear manner, for example, by 0.1 to 0.2 bar each minute, for example. This process continues until the belt has returned to the on-center run region thereof, and so the relevant sensor is no longer covered. As soon as this state has been reached and the relevant sensor is no longer covered, the entire force (burst component and the linearly increasing component) is withdrawn. Proceeding from the force that prevailed before the control intervention, only a small force increase remains as the correction component, which results in a pressure between 0.1 and 0.2 bar of the piston-cylinder unit, for example. A control intervention of that type takes place according to the invention as often as necessary until the belt pretension is compensated by the remaining force components in such a way that the belt no longer runs off-center.

According to the invention it is possible to provide the adjusting element at the support of the roller on only one side. It is also possible, however, to design both bearing regions of the roller having the adjusting element according to the invention on both sides.

The pneumatic actuation of the piston-cylinder unit comprises proportional pressure control valves, for example, in order to apply the additive or subtractive additional force required to the adjusting element in an adjustable manner.

Figure 1:
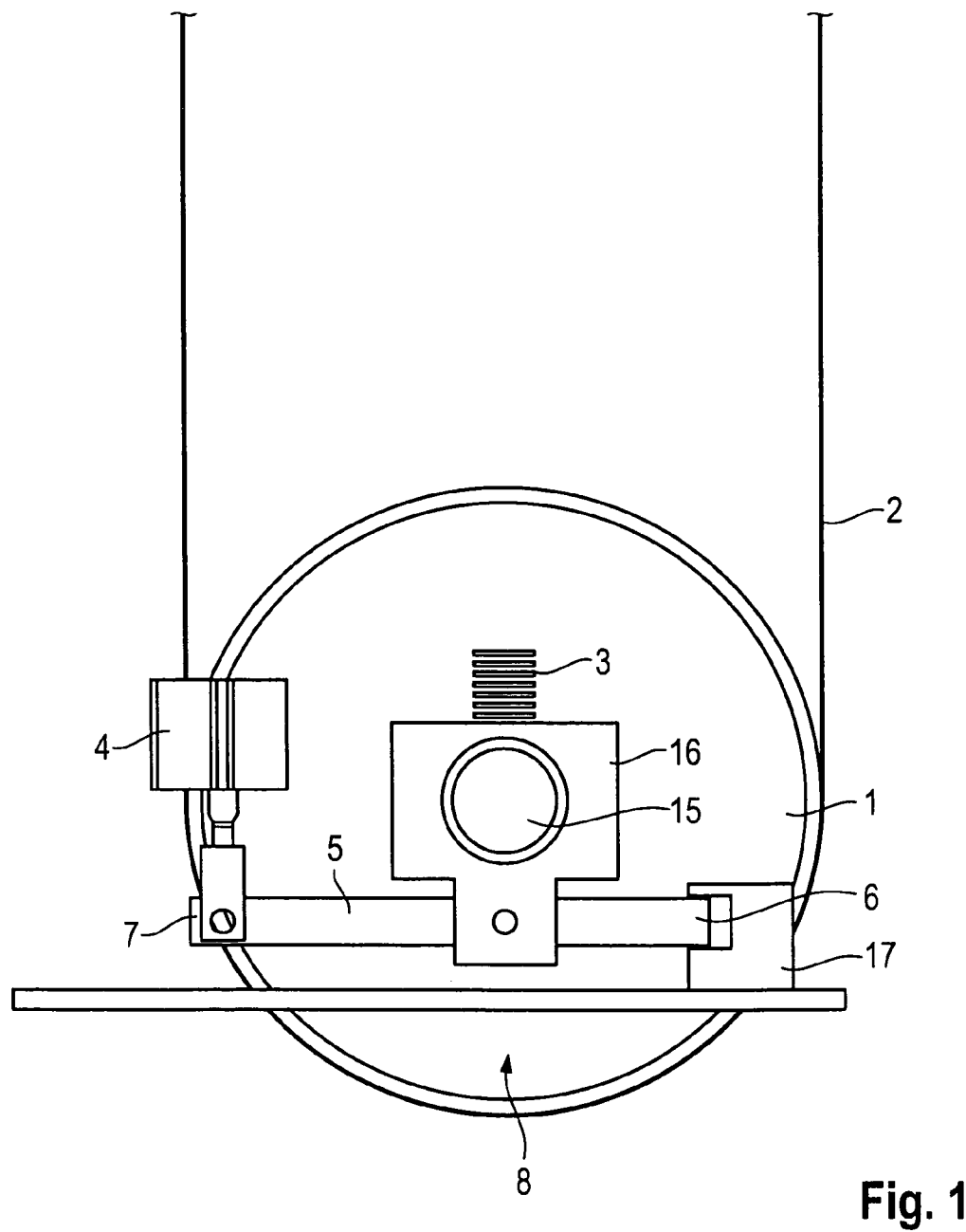
Figure 2:
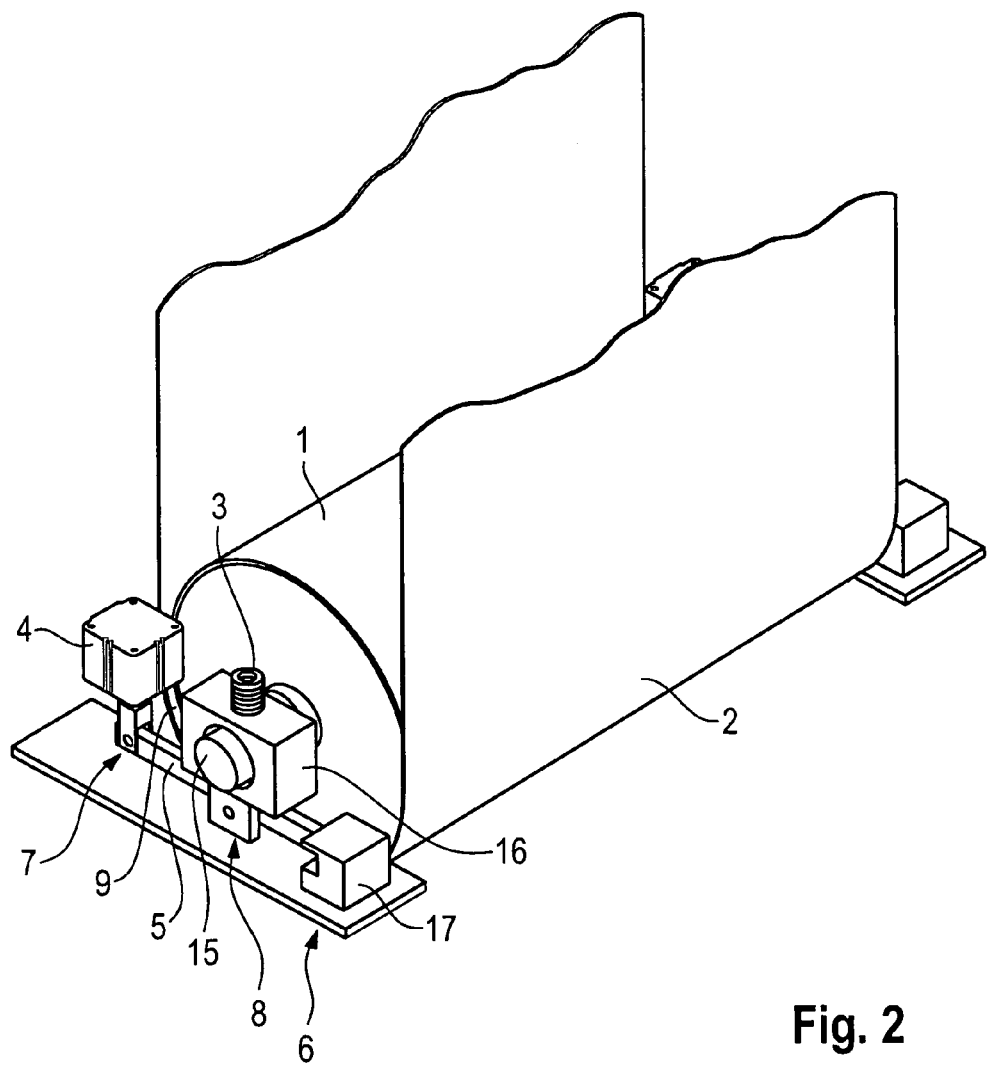
Figure 3:
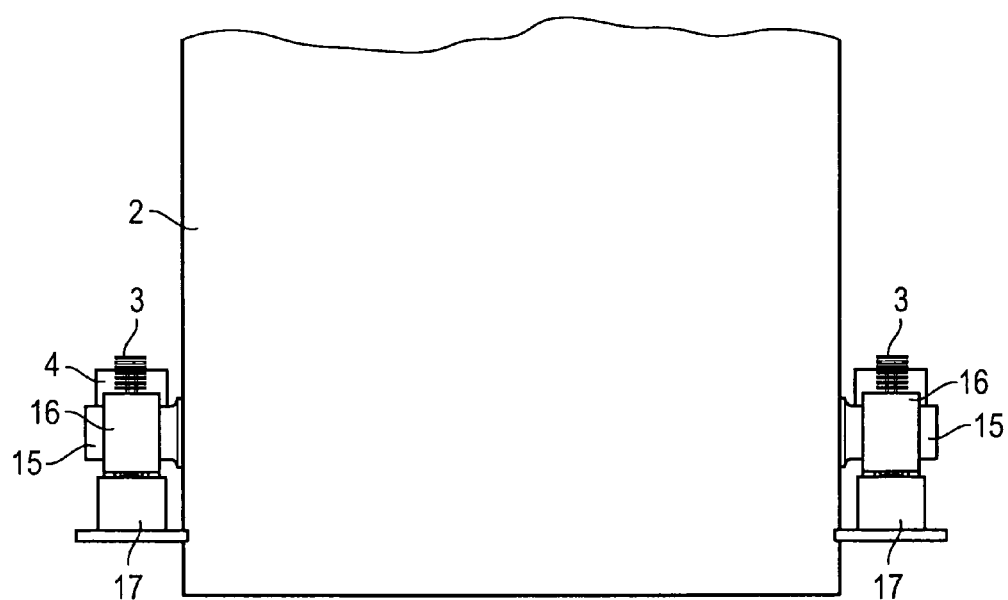
Figure 4:
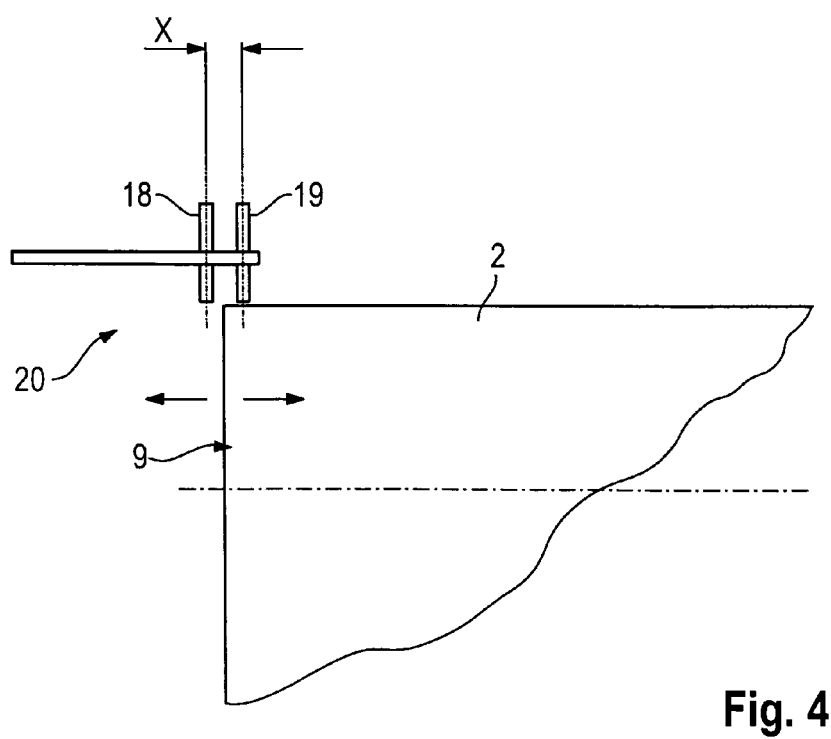
Figure 5:
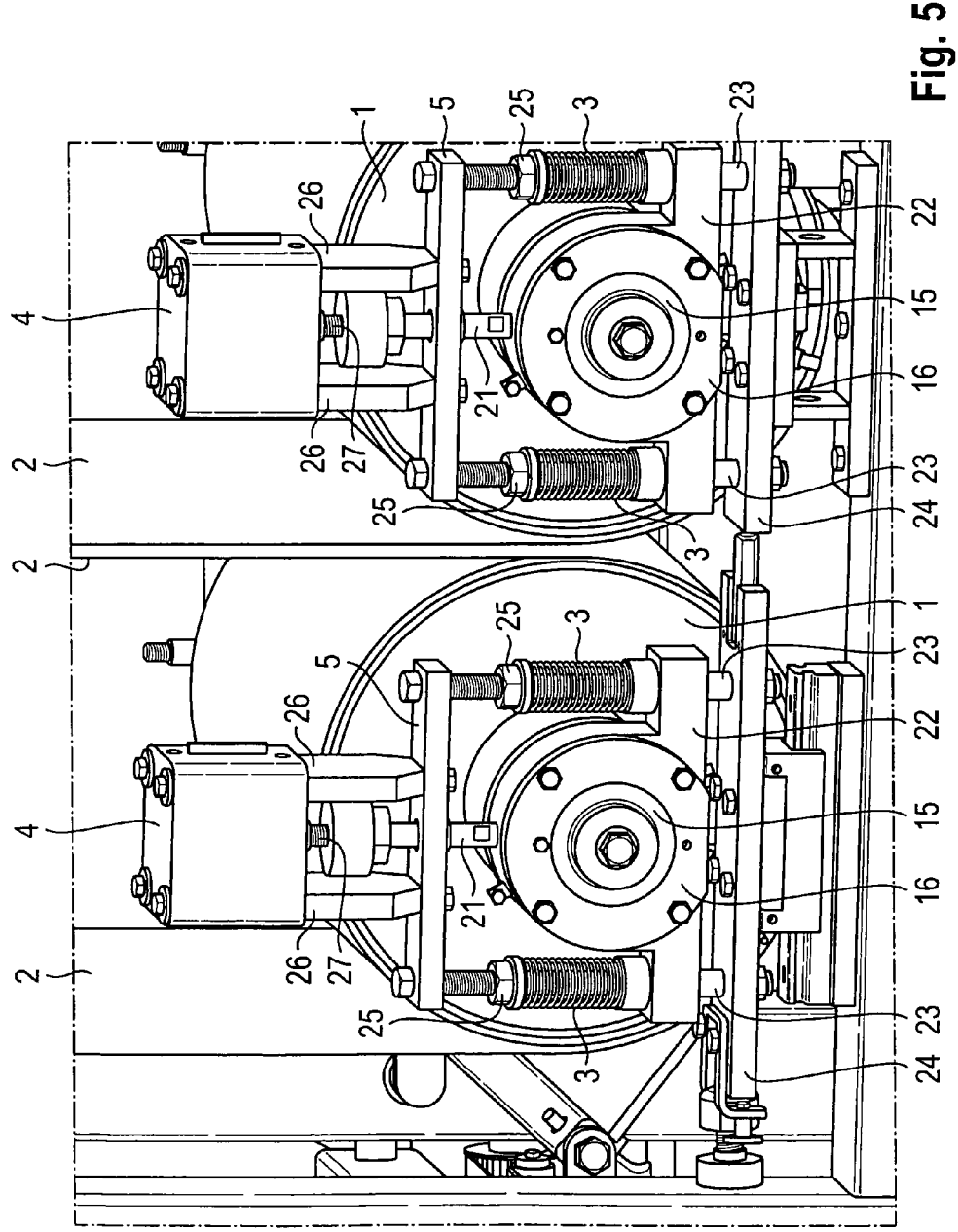

The invention is described in the following by reference to exemplary embodiments in combination with the drawings. Shown are:

FIG. 1 a schematic side view of a first exemplary embodiment of the belt run control device according to the invention, FIG. 2 a simplified, perspective depiction of the arrangement shown in FIG. 1, FIG. 3 a side view of the arrangement according to FIGS. 1 and 2, FIG. 4 a simplified schematic depiction of the position measuring device comprising sensors, FIG. 5 a perspective depiction of a further exemplary embodiment of the invention, and FIG. 6 a schematic side view of a forming and cooling device known from the prior art, comprising a belt run control device according to the invention.

In the following description, identical parts are provided with identical reference numbers.

The figures show a roller 1 that comprises a journal 15 on both sides, which is rotatably supported in a bearing device 16. It is supported against a machine frame, which is not shown in detail, by way of elastic elements 3, in order to tension a revolving, endless belt 2. With respect to the design, reference is made, for example, to the prior art described in association with FIG. 6.

Furthermore, FIGS. 1 to 3 show an adjusting element 5 in the form of a lever. The adjusting element 5 is pivotably supported at one end region 6 at a bearing block 17 and is coupled in the central region 8 thereof to the bearing device 16. A further end region 7 of the adjusting element 5 is connected to a piston-cylinder unit 4, which is pneumatically actuatable. By way of force application by displacement of a cylinder of the piston-cylinder unit 4 it is therefore possible to apply a compression force or a tension force to the adjusting element 5 (lever). The result thereof is an additive or subtractive force with respect to the compression force of the elastic elements 3 (disk springs). In this manner it is possible to change the belt tension laterally and achieve an exact belt run.

FIG. 2 shows, furthermore, that the smaller width of the roller 1 compared to the width of the belt 2 results in a laterally overhanging region 9 of the belt 2, which is detectable using at least one sensor.

FIG. 4 shows, in a schematic side view, a partial region of the belt 2. The laterally overhanging region 9 is shown in particular. A position measuring device 20, which comprises two sensors 18, 19 separated from one another by a distance X, is assigned to the laterally overhanging edge region 9. The position of the belt 2 is the desired position of the belt 2, in which it revolves on-center or centered with respect to the roller 1. An unwanted lateral direction of movement of the belt 2 is depicted by the two arrows in FIG. 4. As indicated by the depiction of FIG. 4, one of the sensors (the sensor 19) is located at the laterally overhanging region 9, while the other sensor 18 is positioned next to the belt 2. The sensors 18 and 19 will therefore output different signals. If the belt run now shifts to the left according to FIG. 4, both sensors 18 and 19 enter the region of the laterally overhanging edge region 9 of the belt 2 and emit an identical signal since both are assigned to the belt 2. The feedback control/controller can therefore detect the direction in which the belt has drifted. Compared thereto, starting from the situation shown in FIG. 4, if the belt moves to the right, both sensors will output an identical signal, which indicates that both sensors are no longer in the region of the belt 2. This signal therefore indicates to the controller/feedback control that the belt has moved to the right based on the depiction of FIG. 4. Reliable belt run control is possible due to this very simple design of the position measuring device 20 provided according to the invention.

FIG. 5 shows a further exemplary embodiment of the belt run control according to the invention. In the exemplary embodiment shown in FIG. 5, two elastic elements 3, which are preferably designed as disk springs or disk spring assemblies, are disposed on both sides of each roller 1. Each of the two elastic elements 3 is connected by way of an adjusting element 5. The preloading forces of the elastic elements 3 are therefore transferred uniformly to the bearing device 16 in order to tension the belt 2. FIG. 5 furthermore shows that, in the central region of the adjusting element 5, which is designed in the manner of a yoke, the piston-cylinder unit 4 is supported thereon. It is designed analogously to the piston-cylinder unit 4 described in association with the first exemplary embodiment, and can therefore apply a force additively or subtractively with respect to the preloading force of the elastic elements 3, and the belt run control according to the invention is therefore possible.

FIG. 5 furthermore shows that bolt-nut assemblies are provided in the region of the elastic elements 3 and the piston-cylinder unit 4 to permit preliminary set-up and adjustment to be carried out.

The two elastic elements 3 (disk spring assemblies) bear against a common transversal member 22, which is connected to the bearing device 16. Bolts 23 extend through the transversal member 22, are movable relative to the transversal member 22, and are fastened at a common support plate 24. It is therefore possible to apply compression forces onto the transversal member 22 by way of the bolts 23 and a nut 25 screwed thereon at the top part, in order to pretension the belt 2.

FIG. 5 shows that the piston-cylinder unit 4 is supported on the adjusting element 5 by way of struts 26. The not-shown, dual-acting piston of the piston-cylinder unit 4 is connected by way of a piston rod 27 to the tension-compression bolt 21, which, in turn, is fastened at the bearing device 16. The piston-cylinder unit 4 can therefore apply forces onto the bearing device 16 additively or subtractively with respect to the preloading forces of the elastic elements 3.

LIST OF REFERENCE CHARACTERS 1 roller
2 belt
3 elastic element
4 piston-cylinder unit
5 adjusting element/lever
6,7 end region
8 central region
9 laterally overhanging region
10 upper roller
11 lower roller
12 food mass/processed cheese
13 cooling fluid
14 strip of food mass
15 journal
16 bearing device
17 bearing block
18, 19 sensor
20 position measuring device
21 tension-compression bolt
22 transversal member
23 bolt
24 support plate
25 nut
26 strut
27 piston rod

The invention claimed is:

1. A belt run control device comprising:
A pair of cylindrical rollers comprising a first cylindrical roller and a second cylindrical roller above, and spaced apart from, the first cylindrical roller, wherein each cylindrical roller is supported by a pair of bearing mounts located at the distal ends of the cylindrical roller for rotatably supporting the cylindrical roller;
an endless belt wrapped around, engaged with, and tensioned between the pair of cylindrical rollers;
at least one elastic element engaged with at least one of the bearing mounts of one of the cylindrical rollers for elastically engaging said one of the cylindrical rollers;
at least one position measuring device proximal to the endless belt comprising at least one sensor capable of detecting and signaling a change in the lateral position of the endless belt relative to the position of at least one of the cylindrical rollers; and
an adjusting element comprising a piston-cylinder unit coupled with the at least one elastic element for applying a force to the at least one elastic element, wherein the adjusting element is operatively associated with the at least one position measuring device for controlling the amount and direction of force applied to the at least one elastic element in response to changes in signals from the at least one position measuring device, wherein the operative association between the at least one position measuring device and the adjusting element is configured to realign the endless belt with the pair of rollers in response to signals from the position measuring device indicating a drift in alignment between the endless belt and the pair of rollers,
wherein
the at least one elastic element supports the cylindrical roller via the bearing mount with which the at least one elastic element is engaged, whereby the at least one elastic element is preloaded by a force of engagement with the first cylindrical roller and
the adjusting element is capable of applying force to the elastic element additively and also subtractively relative to the preload force.

2. The belt run control device according to claim 1, wherein the adjusting element is a second-order lever having a first end and a second end, wherein the second-order lever is pivotably supported at the first end, coupled to the piston-cylinder unit at the second end and coupled with the elastic element between the first end and the second end.

3. The belt run control device according to claim 1, wherein the device comprises at least two elastic elements coupled to the piston-cylinder unit via a coupling element connecting the at least two elastic elements with the piston cylinder unit.

4. The belt run control device according to claim 1, wherein the elastic element comprises disk springs.

5. The belt run control device according to claim 1, wherein each position measuring device is disposed proximal to only one side of the belt.

6. The belt run control device according to claim 5, wherein each sensor is an inductive sensor.

7. The belt run control device according to claim 1, wherein at least one cylindrical roller is shorter than the width of the endless belt, so that the width of the endless belt extends laterally beyond the length of the at least one cylindrical roller having a length shorter than the width of the endless belt.

8. The belt run control device according to claim 7, wherein the position measuring device is located proximal to the width of the endless belt extending laterally beyond the length of the at least one cylindrical roller having a length shorter than the width of the endless belt.

9. The belt run control device according to claim 6, wherein each position measuring device comprises a plurality of sensors.

10. A forming and cooling device for processing a flowable, melted food mass comprising at least two belt run control devices according to claim 1, wherein said belt run control devices are positioned adjacent to each other such that at least a portion of the belt of at least one said device faces at least a portion of the belt of at least one other said device.

11. The forming and cooling device according to claim 10, wherein the second cylindrical roller of each pair of cylindrical rollers of each belt run control device is vertically above the first roller of the same pair of cylindrical rollers.

12. The forming and cooling device according to claim 10, wherein each said belt run control device comprises at least two elastic elements coupled to the piston-cylinder unit via a coupling element connecting the at least two elastic elements with the piston cylinder unit.

13. The forming and cooling device according to claim 10, wherein each elastic element of each belt run control device comprises disk springs.

14. The forming and cooling device according to claim 10, wherein at least one cylindrical roller of each said belt run control device is shorter than the width of the endless belt, so that the width of the endless belt extends laterally beyond the length of the at least one cylindrical roller having a length shorter than the width of the endless belt; the position measuring device of each belt run control device is located proximal to the width of the endless belt extending laterally beyond the length of the at least one cylindrical roller having a length shorter than the width of the endless belt; and each sensor of each belt run control device is an inductive sensor.

15. The forming and cooling device according to claim 14, wherein the at least one position measuring device of each belt run control device comprises only one position measuring device for each said belt run control device, wherein each position measuring device comprises only two sensors.

16. The forming and cooling device according to claim 10 further comprising at least one vertical guide element for restricting horizontal displacement of at least one mount element supported by at least one elastic element.

17. The forming and cooling device according to claim 11, wherein each said belt run control device comprises at least two elastic elements coupled to the piston-cylinder unit via a coupling element connecting the at least two elastic elements with the piston cylinder unit and each elastic element comprises disk springs.

18. The forming and cooling device according to claim 11, wherein the at least one elastic element of said belt run control device is engaged with the bearing mount of the first cylindrical roller of said belt run control device for elastically engaging the first cylindrical roller.

\* \* \* \* \*